Patented Dec. 12, 1950

2,533,709

UNITED STATES PATENT OFFICE 2,533,709

LEAD-ACID TYPE ELECTRIC ACCUMULATORS

Walter Elliott Batt, Clifton Junction, near Manchester, England, assignor to The Electric Storage Battery Company, Philadelphia, Pa., a corporation of New Jersey No Drawing. Application October 5, 1945, Serial No. 620,654. In Great Britain October 12, 1944

2 Claims. (Cl. 136—26)

In connection with accumulator cells of the lead-sulphuric acid-lead peroxide type in which the plates after their "reduction" or formation are stored dry until the cells are required for use, when after the addition of acid, cells containing such plates can be submitted to their normal discharge without preliminary charge, it is known that deterioration of the sponge lead negative plates may occur through atmospheric oxidation during storage both before and after assembly, and it is the object of the present invention to provide convenient and effective means for counteracting or overcoming the effects of such oxidation.

By research and experiment I have found that if a metal which is more electro-negative than lead and of which the sulphate is soluble in the sulphuric acid electrolyte be introduced into the cell, preferably in intimate or electrical contact with the negative plate or plates or any of the negative plates, then the action of the electrolyte will result in the oxidation of the sponge lead negative plate or plates being counteracted or overcome and any lead oxide or other lead compounds converted back to sponge lead so that better activation is obtained than would otherwise be possible.

The invention comprises the introduction into the cell, preferably in intimate or electrical contact with one or more of the negative plates, of a metal which is more electro-negative than lead and of which the sulphate is soluble in the sulphuric acid electrolyte, such metals being for example zinc, cadmium, aluminium and magnesium.

The metal, such as zinc, may be introduced in the form of plain or perforated strips, ribbons, or sheets which may be pressed upon or brought into electrical contact with the surface or surfaces of the negative plate or plates or introduced between the usual separators and the negative plates. Alternatively, the metal may be sprayed or electro-plated on to the surface of the negative plate or plates, in which case it may have a protective or preservative effect which minimises the oxidation action of the atmosphere upon the active material.

If the cell is to be recharged after use, the electrolyte may be replaced with sulphuric acid electrolyte of suitable strength.

The improvement effected by the use of my invention is particularly noticeable when the cells are called upon to function very soon after filling with electrolyte and/or where low temperatures are met with, because an accumulator embodying my invention gives a higher initial discharge voltage than that obtained with sponge lead alone and further as a considerable temperature rise results from the reaction, the initial voltage is helped when there is a low ambient temperature.

What I claim is:

1. A method of treating negative active materials of lead peroxide-lead-sulphuric acid accumulators of the type that are stored without electrolyte, comprising the step of applying zinc in contact with the previously charged negative active material.

2. A method of reducing oxides on negative active materials of lead peroxide-lead-sulphuric acid accumulators of the type that are stored without electrolyte, comprising the step of applying zinc in contact with the previously charged negative active material, and adding sulphuric acid electrolyte to the accumulator.

WALTER ELLIOTT BATT.

REFERENCES CITED

The following references are of record in the file of this patent:

UNITED STATES PATENTS

| Number | Name | Date |
| --- | --- | --- |
| 599,315 | Crowdus | Feb. 22, 1898 |
| 912,351 | Ziegenberg | Feb. 16, 1909 |
| 1,483,885 | Hoen | Feb. 19, 1924 |
| 1,533,568 | Pouchain | Apr. 14, 1925 |
| 1,765,137 | Dunham | June 17, 1930 |
| 1,826,724 | Booss et al. | Oct. 13, 1931 |
| 2,101,326 | Woodbridge | Dec. 7, 1937 |

FOREIGN PATENTS

| Number | Country | Date |
| --- | --- | --- |
| 20,328 | Great Britain | of 1906 |
| 209,749 | Great Britain | Jan. 10, 1924 |